United States Patent
Bruce et al.

(10) Patent No.: US 11,448,037 B2
(45) Date of Patent: Sep. 20, 2022

(54) DOWNHOLE APPARATUS AND METHOD FOR DELIVERING SETTABLE MATERIAL

(71) Applicant: Deltatek Oil Tools Limited, Aberdeen (GB)

(72) Inventors: Stephen Edmund Bruce, Tayside (GB); David Michael Shand, Banchory (GB); Tristam Paul Horn, Aberdeen (GB)

(73) Assignee: Deltatek Oil Tools Limited, Aberdeen (GB)

( * ) Notice: Subject to any disclaimer, the term of this patent is extended or adjusted under 35 U.S.C. 154(b) by 0 days.

(21) Appl. No.: 16/634,546

(22) PCT Filed: Aug. 1, 2018

(86) PCT No.: PCT/GB2018/052203
§ 371 (c)(1),
(2) Date: Jan. 27, 2020

(87) PCT Pub. No.: WO2019/025799
PCT Pub. Date: Feb. 7, 2019

(65) Prior Publication Data
US 2021/0087905 A1 Mar. 25, 2021

(30) Foreign Application Priority Data

Aug. 1, 2017 (GB) ..................... 1712362
Apr. 27, 2018 (GB) ..................... 1806937

(51) Int. Cl.
*E21B 33/14* (2006.01)
*E21B 17/07* (2006.01)
(Continued)

(52) U.S. Cl.
CPC .............. *E21B 33/14* (2013.01); *E21B 17/07* (2013.01); *E21B 33/13* (2013.01); *E21B 33/16* (2013.01);
(Continued)

(58) Field of Classification Search
CPC ........ E21B 33/14; E21B 36/001; E21B 17/07; E21B 34/063
See application file for complete search history.

(56) References Cited

U.S. PATENT DOCUMENTS 3,103,973 A 9/1963 Mullen
3,171,480 A 3/1965 Carter
(Continued)

FOREIGN PATENT DOCUMENTS

WO 0077431 A2 12/2000
WO 2014058777 A1 4/2014

OTHER PUBLICATIONS

International Search Report and Written Opinion issued in counterpart PCT Application No. PCT/GB2018/052203 dated Jan. 23, 2019.

*Primary Examiner* — Catherine Loikith
(74) *Attorney, Agent, or Firm* — David S. Bradin; Nexsen Pruet, PLLC

(57) ABSTRACT

A method of conditioning a well bore featuring an annulus (50) between a bore-lining tubing (20) and a surrounding bore wall (110) comprises pumping conditioning fluid through an inner tubing (10) located within the bore-lining tubing (20) and into a portion of the well bore containing the bore-lining tubing to affect the temperature of the portion of the well bore containing the bore-lining tubing. The annulus (50) between the bore-lining tubing (20) and the surrounding bore wall (110) is at least partially filled with settable material (54). The affected temperature of the portion of the well bore containing the bore-lining tubing influences the (Continued)

setting of the settable material. For example, heating the bore may accelerate setting of the material, while cooling the bore may retard setting of the material.

25 Claims, 6 Drawing Sheets

(51) Int. Cl.
| | |
|---|---|
| *E21B 47/005* | (2012.01) |
| *E21B 33/16* | (2006.01) |
| *E21B 34/06* | (2006.01) |
| *E21B 34/08* | (2006.01) |
| *E21B 47/06* | (2012.01) |
| *E21B 36/00* | (2006.01) |
| *E21B 33/13* | (2006.01) |

(52) U.S. Cl.
CPC ............ *E21B 34/063* (2013.01); *E21B 34/08* (2013.01); *E21B 36/001* (2013.01); *E21B 47/005* (2020.05); *E21B 47/06* (2013.01); *E21B 2200/06* (2020.05)

(56) References Cited

U.S. PATENT DOCUMENTS

| | | | |
|---|---|---|---|
| 3,183,971 A | | 5/1965 | McEver et al. |
| 3,189,089 A | | 6/1965 | Carter |
| 3,416,602 A | | 12/1968 | Boughton |
| 3,583,485 A | | 6/1971 | Woods et al. |
| 4,671,358 A | | 6/1987 | Lindsey, Jr. et al. |
| 9,359,845 B2 | * | 6/2016 | Grodem .................. E21B 23/06 |
| 2012/0211232 A1 | | 8/2012 | Grodem |
| 2020/0263533 A1 | * | 8/2020 | Bruce .................... E21B 36/001 |

* cited by examiner

DOWNHOLE APPARATUS AND METHOD FOR DELIVERING SETTABLE MATERIAL

CROSS REFERENCE TO RELATED APPLICATIONS

This application is a 35 U.S.C. § 371 U.S. national phase entry of International Application No. PCT/GB2018/052203 having an international filing date of Aug. 1, 2018, which claims the benefit of United Kingdom Application No. 1712362.1 filed Aug. 1, 2017, and also United Kingdom Application No. 1806937.7 filed Apr. 27, 2018, each of which is incorporated herein by reference in its entirety.

FIELD

This disclosure relates to downhole apparatus and downhole methods. The apparatus and methods may be utilised in downhole operations involving the delivery and curing or hardening of settable materials, such as cement slurry.

BACKGROUND

In the oil and gas industry boreholes or well bores may be drilled in the earth to access subsurface hydrocarbon-bearing formations. The drilled boreholes are typically lined with metal tubing, often referred to as casing or liner. The annulus between the bore-lining tubing and the surrounding bore wall may be filled with a settable material, typically a cement slurry, which hardens to provide support for the bore wall and the tubing. The hardened material may also restrict or prevent migration of fluid through the annulus, for example from a formation containing fluid at higher pressure into a lower pressure formation.

The cement slurry may be prepared on surface and then pumped down into the bore. In many instances, the slurry is pumped down through the bore-lining tubing and then passes through the end of the tubing and up into the surrounding annulus. A displacement fluid is pumped into the tubing behind the slurry and pushes the cement slurry into and up through the annulus. The pumping operation is continued until the slurry fills the annulus, or at least occupies a predetermined volume of the annulus. Several thousand metres of annulus may be cemented in a single operation.

As will be appreciated, cementing operations are technically challenging and complex, and many factors must be taken into consideration. It is generally considered desirable for the cement slurry to harden relatively quickly. However, a cementing operation may take many hours to complete, and it is of course essential that the lead portion of cement remains in a fluid condition long enough to pass down into the borehole and then up through the annulus to the desired fill level. Cement slurry formulations (cement recipes) are typically complex mixtures of mix-water, Portland cement and chemical additives. The cement slurry setting time is tailored as a function of the geo-thermal gradient of the bore hole and the pump time. In areas where the geo-thermal gradient is non-linear, contains hot zones, or is unpredictable (new exploration area), additional pump time is added to the desired setting time as an additional pumping time safety factor. This additional safety factor greatly extends the cement setting time and can lead to delays of subsequent operations.

In general, settable materials cure or harden more rapidly at higher temperatures. In U.S. Pat. No. 3,103,973 to Mullen, it is proposed to inject a heat-generating solution into an earthen cavity in or adjacent to which cementing is to be done. In one described example, an acid-sodium hydroxide mixture is pumped into a casing, separated from an aqueous cement slurry by a rubber plug. Water is pumped into the casing above the acid-sodium hydroxide mixture until the rubber plug has reached the bottom of the casing and the cement slurry has been forced outwardly around the lower end of the casing and has filled the annulus between the casing and the well bore. At this point the acid-sodium hydroxide mixture is on the inside of the casing directly opposite the cement slurry so that heat being liberated from the mixture is conducted through the casing and maintains the temperature of the cement slurry higher than the temperature would have been in the absence of the aqueous acid-sodium hydroxide solution. This method is proposed as being useful when operating in higher altitudes and latitudes, such as the Canadian permafrost region.

US Patent Application publication no US 2005/0194190 to Becker et al. discloses use of an electric heating tool which can be lowered into an oil well to apply heat at a precise depth to provide localized heating of a fresh cement slurry to accelerate curing. The drawings illustrate the heating tool being used to heat the tail cement portion at the bottom of the well bore.

SUMMARY

The present disclosure provides a method of conditioning a well bore featuring an annulus between a bore-lining tubing and a surrounding bore wall, the method comprising pumping conditioning fluid through an inner tubing within the bore-lining tubing, and into a portion of the well bore containing the bore-lining tubing, at least one feature of the conditioning fluid being controlled to affect the temperature of the portion of the well bore containing the bore-lining tubing, and at least partially filling the annulus between the bore-lining tubing and the surrounding bore wall with settable material, whereby the affected temperature of the portion of the well bore containing the bore-lining tubing influences the setting rate of the settable material.

In another example, the at least one feature of the conditioning fluid is controlled such that the affected temperature of the portion of the well bore containing the bore-lining tubing influences the dimensions of the bore-lining tubing. In such an example, the conditioning fluid may be pumped into the well bore before or after at least partially filling the annulus between the bore-lining tubing and the surrounding bore wall with settable fluid.

The at least one feature of the conditioning fluid may be controlled by an operator to raise or lower the temperature of the portion of the well bore containing the bore-lining tubing.

The conditioning fluid may be pumped into a volume adjacent the bore-lining tubing to affect the temperature of the portion of the bore-lining tubing adjacent the volume. The affected temperature of the bore-lining tubing may at least one of influence the setting rate of the settable material in at least the portion of the annulus adjacent the volume and influence the dimensions of the bore-lining tubing.

The disclosure also relates to an apparatus for conditioning a well bore. In one example, the apparatus comprises a tubular body for mounting on an inner tubing string, a first flow port, a second flow port, and a third flow port, and a connector operatively associated with the tubular body and operable to at least one of engage with and disengage from a lower end of a bore-lining tubing string, the apparatus having a first configuration in which the first flow port is open and the second and third flow ports are closed, whereby a settable material may be pumped in a first direction downwards through the tubular body, the connector, and the first flow port, and a second configuration in which the first flow port is closed and at least one of the second and third flow ports is open, whereby a conditioning fluid may be pumped in the first direction down through the tubular body, through the at least one of the second and third flow ports, and then flow in a second direction upwards and externally of the tubular body.

Conditioning fluid may be pumped into the portion of the well bore containing the bore-lining tubing before the step of at least partially filling the annulus between the bore-lining tubing and the surrounding well bore with settable material. Alternatively, conditioning fluid may be pumped into the portion of the well bore containing the bore-lining tubing after the step of at least partially filling the annulus between the bore-lining tubing and the surrounding well bore with settable material. Accordingly, the conditioning fluid may be directed into an internal volume of the bore-lining tubing. Furthermore, the conditioning fluid may be pumped into the volume within the bore-lining tubing, after part-filling the annulus between the bore-lining tubing and the surrounding well bore with settable material and before further filling the annulus between the bore-lining tubing and the surrounding well bore with settable material.

Conditioning fluid may be pumped into the annulus between the bore-lining tubing and the surrounding well bore.

A predetermined volume of conditioning fluid may be pumped into the portion of the well bore containing the bore-lining tubing and then left in the well bore for a predetermined time interval. Alternatively, or in addition, conditioning fluid may be circulated through the bore-lining tubing. Fluid displaced from the well bore by the conditioning fluid may flow out of an upper end of the bore-lining tubing.

The conditioning fluid may be utilised to cool at least a portion of the well bore. Alternatively, or in addition, the conditioning fluid may be utilised to heat at least a portion of the well bore. Furthermore, the conditioning fluid may be utilised to maintain at least a portion of the well bore at a predetermined temperature, or within a predetermined temperature range.

The conditioning fluid may be cooled to below ambient temperature before being pumped into the well bore. In this case, ambient temperature may be the ambient air temperature near the pump for pumping the conditioning fluid, or the ambient air temperature near other associated equipment, for example the ambient air temperature around a drilling rig or on a ship. Alternatively, ambient temperature may be the sea temperature in the vicinity of a drilling rig or ship or may be the surface sea temperature or the temperature at the sea floor. Alternatively, or in addition, the conditioning fluid may be heated to above ambient temperature before being pumped into the well bore. The temperature of the conditioning fluid may be varied over the course of a cementing operation.

The conditioning fluid may comprise materials which react exothermically, which reaction may increase the temperature of the fluid, or the conditioning fluid may comprise materials which react to lower the temperature of the fluid.

The conditioning fluid may flow from the inner tubing directly into a selected volume within the bore-lining tubing. For example, the conditioning fluid may flow directly from the inner tubing into: a lower location within the bore-lining tubing; one or more intermediate locations within the bore-lining tubing, or an upper location within the bore-lining tubing. Of course, the well bore may be inclined or horizontal, in which case the locations may be described as distal, intermediate or proximal locations. The conditioning fluid may flow directly into selected volumes within the bore-lining tubing in a predetermined sequence, for example the fluid may flow directly into an upper location, and then into one or more intermediate locations, and then into a lower location.

The inner tubing may be provided in association with one or more flow ports or fluid outlets providing fluid communication between the interior of the inner tubing and the annulus between the bore-lining tubing and the surrounding bore wall. Alternatively, or in addition, the inner tubing may be provided with one or more flow ports or fluid outlets providing fluid communication between the interior of the inner tubing and a volume or inner annulus between the bore-lining tubing and the inner tubing. The fluid outlets may be provided at a single location or at spaced locations along the length of the inner tubing, for example a fluid inlet may be provided towards a distal end of the tubing, one or more fluid outlets may be provided intermediate the ends of the tubing, and a fluid outlet may be provided towards a proximal end of the tubing. One or more of the fluid outlets may be provided with a valve operable to control flow of fluid through the outlets. Where a plurality of valves is provided the valves may be operated individually, or one or more valves may be operated in unison. The valves may be operated by any appropriate mechanism or control, for example by tubing pressure, by landing a closing device or an operating device such as a ball or dart in the valve, or by pumping RFID tags to initiate operation of the valve. The valves may be provided with burst discs or the like or may include sliding valve members. Any valves controlling flow of conditioning fluid between the interior of the inner tubing and the inner annulus may be initially closed and may be opened under operator control to permit flow from the inner tubing into the inner annulus. The valves may be subsequently closed.

The settable material may be delivered to an annulus between the bore-lining tubing and the bore wall via the inner tubing.

An inner annulus between the bore-lining tubing and the inner tubing may be closed at an upper or proximal end. A flow control device may be provided to control flow of fluid from the upper or proximal end of the inner annulus. Fluid flowing through the flow control device may have been displaced from the inner annulus by the conditioning fluid or may be conditioning fluid that has been circulated through the inner annulus.

The conditioning fluid may be utilised to maintain or increase the temperature of the settable material and may thus accelerate the setting or curing of the settable material. The conditioning fluid may be directed to accelerate the setting of the settable material at a selected location in the well bore. For example, the conditioning fluid may be utilised to accelerate the setting of cement in the portion of the annulus between the lower or distal end of bore-lining tubing and the surrounding bore wall, at any selected zone of interest, or indeed across the whole annulus. The acceleration of the setting may accelerate compressive strength generation or build-up and may reduce wait on cement (WOC) time before operations, for example drilling, may continue in the well bore. In an alternative example, the conditioning fluid may be utilised to accelerate the setting of cement in an upper end portion of the annulus, to facilitate support of other apparatus mounted on the upper end of the bore-lining tubing, such as a blowout preventer (BOP). Characteristics of a settable material may vary with setting temperature or setting time. For example, some cements may set to provide a higher compressive strength if the temperature of the setting cement is increased.

The conditioning fluid may be utilised to increase the temperature of at least a part of the portion of the well bore containing the bore lining tubing by 5.degree. C. or more, 10.degree. C. or more, 15.degree. C. or more, 20.degree. C. or more, 25.degree. C. or more, 30.degree. C. or more, 35.degree. C. or more, or 40.degree. C. or more.

The conditioning fluid may be utilised to maintain or decrease the temperature of the settable material to stop, slow or extend the thickening or curing time of the settable material. For example, the well bore temperature may be reduced to extend a time interval or window available to ensure that the settable material may be circulated into the annulus. This may be particularly advantageous in deep or hot wells. Furthermore, the properties of some settable materials, such as some forms of Portland cement, may be adversely affected by setting at elevated temperatures. Thus, it may be advantageous to utilise the conditioning fluid to reduce the well bore temperature at least one of before and after placing the settable material in the annulus to preserve the desirable properties of the set material. It has also been established that, as the setting temperature increases, the sensitivity of Portland cement systems to subtle chemical and physical differences between the slurry ingredients also increases. Thus, cooling the well bore before or following circulating the settable material may provide for more predictable cement behaviour.

The conditioning fluid may also be utilised to selectively cool a selected location of the well bore. For example, in a longer, deep bore there may be a significant temperature differential between the upper, cooler end of the bore and the lower, hotter end of the bore. The lower end of the bore may thus be cooled to facilitate circulation of the settable material into the annulus, without unnecessarily retarding setting of the material once it is in place in the upper end of the bore. Furthermore, in the absence of cooling a lower portion of the well bore, the temperature profile of the well bore will tend to result in the settable material hardening from the hotter, lower end of the bore upwards, which may not provide optimum conditions in the annulus.

The conditioning fluid may be utilised to provide temperature control of the settable material and thus control the transition of the settable material from a fluid form to a solid, and the final form of the set material. For example, temperature is one of the major factors affecting the hydration rate of Portland cement, and thus may impact on the nature, stability and morphology of the hydration products. Further, in the initial liquid or slurry form, the column of cement in the annulus may provide a significant hydrostatic head and thus be effective in retaining fluid in formations intersected by the well bore, and thus restrict or prevent fluid migration into or along the annulus. As the gel strength of the static settable material increases, the hydrostatic head provided by the material may decrease. Thus, by suppressing the temperature of the bore, and thus the temperature of the settable material, it may be possible to maintain a hydrostatic overbalance for a longer time.

The conditioning fluid may be utilised to create a selected thermal gradient across a portion of the length of the well bore, thereby providing a degree of control over the transition of the settable material from fluid to solid form, which may relate to the rate of gel strength increase. Transition time may be referred to as time from which the static gel strength (SGS) of a cement goes from 100 lbf/100 sq. ft (48 Pa) to 500 lbf/100 sq. ft (240 Pa). It has become an industry standard that once cement slurries reach an SGS of 500 lbf/100 sq. ft (240 Pa), gas or other fluids cannot be transmitted through the cement. Thus, the faster an operator brings the cement through this transition zone (i.e. from an SGS of 100 lbf/100 sq. ft (48 Pa) to 500 lbf/100 sq. ft (240 Pa)), the sooner this optimum SGS is achieved, and the less likely that the cement will transmit gas or other fluids. However, as noted above, an increase in gel strength may be accompanied by a reduction in the hydrostatic head provided by the column of cement, and a decrease in the pressure available to prevent higher pressure fluid from escaping from a formation. Using the method of the present disclosure the operator may control where and when cement slurry goes through the transition zone. In one example, the operator may control the temperature in the well bore such that the portion of cement slurry going through the transition zone is effectively translated through the well bore, typically from a lower portion of the well bore towards an upper portion of the well bore. In this situation an upper portion of the cement slurry may remain in a relatively fluid state while a lower portion transitions towards a solid state, thereby maintaining the hydrostatic pressure effect of the slurry above the hardening cement. This effect may be achieved by circulating heated conditioning fluid at a calculated controlled rate through a selected portion of the well bore. The conditioning fluid may be directed through a selected flow port into a selected volume of the well bore, heating the adjacent bore-lining tubing and settable material. The heated conditioning fluid will progress up through the volume between the inner tubing and the bore-lining tubing at the controlled rate to create a thermal gradient across the length of the portion of the bore-lining tubing and the settable material. The volume of settable material adjacent to the selected flow port will experience the earliest heating, and thus will tend to be the first volume of material to harden. As the heated conditioning fluid moves up through the bore the adjacent settable material will experience a corresponding rise in temperature, and the settable material will thus harden as the heated conditioning fluid progresses up through the well bore, while an upper portion of the settable material remains in a fluid form and continues to provide a hydrostatic pressure force and overbalance to retain fluid in the adjacent earthen formations while the lower portions of cement harden.

This feature may be particularly useful where a bore intersects a formation containing higher pressure fluid at a relatively shallow depth. Using a similar process to that described above, the operator may accelerate setting of cement directly adjacent the formation to achieve an SGS sufficient to prevent passage of fluid from the formation. As this volume of cement goes through the transition zone there will be loss of hydrostatic head, but this loss will be restricted to the targeted volume of cement and the cement above the targeted volume may be retained in fluid form until the fluid is safely retained by the set cement adjacent the formation. Conventional techniques for dealing with these situations include managed pressure cementing, complex slurry trains and expensive additives, which can add very significant costs to the cementing operation.

Similarly, an operator may prefer that only a part of the settable material is setting, or in a transition phase, at any point in time. For certain materials this may be achieved by utilising the conditioning fluid to maintain the well bore at or below a predetermined temperature. This may be achieved by, for example, circulating cooled or unheated conditioning fluid through the well bore before introducing the settable material. Alternatively, or in addition, once the settable material is in place, conditioning fluid may be circulated to maintain the well bore at a lower temperature, thus halting or slowing hydration, curing or setting of the material.

The curing or hardening of the settable material may generate heat. For Portland cement, this may be termed the heat of hydration. This heat may have numerous effects, including autoacceleration of hydration and the thermal expansion of a metallic bore-lining tubing. On subsequent cooling, the bore-lining tubing may shrink, circumferentially and axially, to a greater degree than the surrounding settable material, and a gap, which may be referred to as a thermal micro-annulus, may appear between an outer surface of the bore-lining tubing and the inner surface of the set material, compromising zonal isolation. Furthermore, in deep subsea well bores, the seabed may feature hydrates, that is natural gas molecules which are trapped in ice molecules, and if the seabed is heated the hydrates may be released, risking collapse of the seabed and release of large volumes of flammable gas. In such situations, the conditioning fluid may be utilised to reduce the temperature of the well bore to, for example, reduce or avoid autoacceleration of hydration, minimise thermal expansion of the bore-lining tubing, or minimise heating of the surrounding earth to prevent or reduce release of hydrates.

The conditioning fluid may be utilised to influence one or more dimensions of the bore-lining tubing, such as influencing the circumferential dimension of the tubing or the axial dimension of the tubing. For example, the conditioning fluid may be utilised to expand the bore-lining tubing, contract the bore-lining tubing, or maintain the dimensions of the bore-lining tubing substantially constant. The dimensions of the bore-ling tubing may be influenced by a number of factors, such as the heat of hydration of curing cement and the ambient temperature in the well bore, which will tend to increase with depth. The relative pressure between the interior and the exterior of the bore-lining tubing may also impact on the dimensions of the tubing. These factors will have a varying impact and influence over time, for example the heat of hydration will reduce as the cement cures, while the temperature of the bore-lining tubing will likely rise from an initial temperature when the tubing is initially run into the bore, or the tubing is surrounded by recently introduced and relatively cool cement slurry, to a temperature close to the surrounding earth formations. The bore-lining tubing may also experience other temperature and pressure changes subsequent the cementing operation, for example as fluid is circulated through the bore-lining tubing during subsequent drilling operations. Where there is differential expansion or contraction between the bore-lining tubing and the surrounding set material there is an increased risk of separation of the outer surface of the bore-lining tubing and the inner surface of the set material, and the formation of a micro-annulus, which impacts on the pressure integrity of the well bore. As will be described, in accordance with an aspect of the disclosure, the conditioning fluid may be utilised to control or influence the expansion or contraction of the bore-lining tubing.

The conditioning fluid may be utilised to reduce the temperature of the bore-lining tubing, or at least reduce or control the rise in temperature of the bore-lining tubing due to other factors. This may be achieved by circulating conditioning fluid into the bore well prior to placing settable material in the annulus, or by circulating conditioning fluid into the bore well after placing settable material in the annulus.

The conditioning fluid may be utilised to maintain the temperature of the bore-lining temperature below the ambient temperature of the well bore while the settable material is hardening. Once the settable material has hardened the temperature of the bore-lining tubing may be allowed to rise to the ambient temperature of the well bore, which will be accompanied by thermal expansion of the bore-lining tubing. This thermal expansion of the bore-lining tubing will be restrained by the surrounding set material. This will close any existing micro-annuli between the bore-lining tubing and the set material and will minimise the risk of micro-annuli forming in future.

The temperature of fluids in a well bore may be measured or estimated using a variety of apparatus or models. Estimating the temperature of conditioning fluid and cement slurry in a bore may utilise a computer simulation, such as the Wellbore Simulator (Trade Mark). Such simulations utilise known inputs such as cement volumes, bottom-hole static temperature, geothermal gradient, sea temperature, sea-bed temperature, sea current and the like. Similar tools may be utilised to estimate the changes in temperature experienced by conditioning fluid being pumped from a rig into a bore, and so determine the most appropriate initial temperature for the conditioning fluid, and the most appropriate flow rate of conditioning fluid. The supply of heated or cooled conditioning fluid into a bore will allow the operator to vary the temperatures and gradients within the bore which were previously considered constants, thus providing an additional degree of control and influence over the bore conditions.

The density of the conditioning fluid may be selected or varied to facilitate provision of a predetermined pressure within the bore-lining tubing while the settable material hardens or cures. The internal pressure may be selected to control or influence pressure-related deformation of the bore-lining tubing, and in particular to minimise creation of a micro-annulus between the bore-lining tubing and the hardened settable material. For example, the bore-lining tubing and the settable material may contract by different degrees as Portland cement-based slurry sets and cools, following initial hydration. Also, the settable material may shrink due to water loss into the surrounding earth formations, and the hydrostatic pressure exerted by the settable material on the bore-lining tubing may decrease as the material thickens and as the gel strength of the material increases. By selection of an appropriate density for the conditioning fluid, for example a lower density, the bore-lining tubing may tend to describe a smaller diameter and be less likely to shrink subsequently and separate from the surrounding cement.

The conditioning fluid, or a flushing fluid, may be utilised to conduct a pressure test on the bore-lining tubing, which test may be conducted following the circulation of the settable material into the annulus between the bore-lining tubing and the well bore, and prior to the setting of the material. A plug may be dropped or pumped into a flow port in communication with the bore-lining tubing, or a valve closed, to isolate the conditioning fluid from the settable material in the annulus.

The bore-lining tubing may be provided with a shoe at a leading end of the tubing, which shoe may include a float valve that permits flow of fluid from within the tubing to the exterior of the tubing, but which restricts or prevents reverse flow into the tubing. The bore-lining tubing may include a profile to engage with a connector provided at a leading or distal end of the inner tubing, which profile may be incorporated in a tubing or float shoe. The inner tubing connector may include a cooperating profile. The distal end of the inner tubing may be configured for stabbing or latching engagement with the bore-lining tubing. Release of the inner tubing from the bore-lining tubing may require rotation, for example to back out a threaded connection. A first flow port providing fluid communication between the interior of the inner tubing and the exterior of the bore-lining tubing may be provided in the float shoe or may be provided in the connector.

The inner tubing may include a coupling portion which permits selective transmission of torque between portions of the inner tubing. In one configuration torque may be transferred from a proximal end of the inner tubing to a distal end of the inner tubing, for example to allow coupling or uncoupling of a threaded connector. In another configuration, a proximal end of the inner tubing may be rotated without transfer of the rotation to the distal end of the tubing. Such a coupling portion may be configured to allow rotation of an upper portion of the inner tubing to permit engagement or disengagement of threaded couplings above the coupling portion without affecting threaded couplings below the coupling portion. The coupling portion may be telescopic and feature a spline arrangement in which the coupling portion may be extended to engage the spline arrangement and compressed to disengage the spline arrangement. The coupling portion may be made in accordance with the teaching of UK Patent Applications GB2525148A and GB2545495A, the disclosures of which are incorporated herein in their entirety.

An upper or proximal end of the bore-lining tubing may be sealed, for example such that the volume or inner annulus between the inner tubing and the bore-lining tubing may be pressurised. A flow port may be provided to allow fluid to be circulated from or into the volume. The flow port may be provided with a valve to control flow from or into the volume.

The inner tubing and the bore-lining tubing may be provided in combination with running apparatus to facilitate location of the tubing in a well bore from a surface rig. The running apparatus may comprise a running string and a running tool. The running tool may provide a seal towards an upper or proximal end of the bore-lining tubing. The running tool and the bore-lining tubing may be provided with cooperating profiles, for example cooperating threads. In one example, the running tool may engage the bore-lining tubing via a left-handed thread.

The running string may be insulated or otherwise configured to minimise heat loss or gain from fluid passing through the string. A conventional running string is likely to be formed of steel tubing, such as drill pipe. Thus, for example, if the running string extends from surface through several thousand meters of cold sea water, hot water being pumped at pressure through the string will experience significant heat loss between the rig and the sea bed. Insulating material, such as a foamed material, may be provided around the exterior of a conventional string, an inner conduit of non-metallic material may be provided to carry the fluid through the metallic string, or the string may extend through a larger string, such as a riser, to minimise heat loss. In other examples a heating element may be provided in or associated with the string.

The bore-lining tubing may take any appropriate form and may be, for example, casing, liner, or completion tubing. The bore-lining tubing may be formed of any suitable material but will typically be metallic and may steel or another alloy. Casing and liner may be formed from tubular joints provided with male threaded end portions which are coupled using external female threaded connectors. In this document the term "casing" may be used as a reference to bore-lining tubing in general, and should not be interpreted to exclude liner or other forms of bore-lining tubing.

The bore wall surrounding the bore-lining tubing may be formed of the earthen wall of the drilled well bore or may be formed, at least in part, by another bore-lining tubing, for example an existing casing section.

The inner tubing may take any appropriate form and may comprise an inner string, a major portion of which may be formed of drill pipe. A drill pipe string may comprise multiple drill pipe joints, typically each joint having an externally threaded pin connection at a lower end and an internally threaded box connection at an upper end.

Portions of the inner tubing may be insulated to minimise heat transfer from fluid passing through the tubing to surrounding fluid. Alternatively, or in addition, the inner tubing may be formed of a non-metallic material or include a non-metallic inner wall. The non-metallic material may be a composite selected to be less heat conductive than metal tubing.

The inner tubing may be coaxial with the bore-lining tubing, may be located to one side of the bore-lining tubing, or may have a helical form. The inner tubing may not be subject to substantial loading and may therefore comprise a relatively lightweight material, such as an extruded or pultruded composite.

The conditioning fluid may take any appropriate form and may be, for example, water, brine, seawater or drilling fluid.

The settable material may take any appropriate form and may comprise cement slurry, grout, epoxy or a two-component material that hardens following mixing of the components. If the settable material is cement slurry, the cement may be of any appropriate formulation suitable for the well bore conditions. The cement slurry may comprise a Portland cement.

Heating or cooling apparatus may be provided for heating or cooling the conditioning fluid. The heating or cooling apparatus may be provided on a drilling rig or ship. The heating or cooling apparatus may take any appropriate form and may comprise a heat exchanger.

In another aspect, the present disclosure provides a method of conditioning a well bore featuring an annulus between a bore-lining tubing and a surrounding bore wall, the method comprising pumping conditioning fluid through an inner tubing located within the bore-lining tubing and into a portion of the well bore containing the bore-lining tubing to affect the temperature of the portion of the well bore containing the bore-lining tubing, and at least partially filling the annulus between the bore-lining tubing and the surrounding bore wall with settable material, whereby the affected temperature of the portion of the well bore containing the bore-lining tubing influences the setting of the settable material.

In another aspect, the disclosure provides an apparatus for conditioning a well bore, the apparatus comprising a tubing string for location within bore-lining tubing and having a lower end portion for coupling to the bore-lining tubing and a plurality of flow ports at spaced locations along the tubing string, wherein the valves are initially closed and are openable to permit fluid to be flowed from the tubing string and out of the flow ports.

A further aspect of the disclosure relates to a settable material sampling method comprising: pumping settable material into a well bore annulus surrounding a bore-lining tubing string via an inner tubing string located within the bore-lining tubing string; retaining a volume of the settable material in a lower end of the inner tubing string; allowing the volume of settable material to set; retrieving the inner tubing string from the well bore; and removing the volume of set material from the inner tubing string.

The method may be utilised in combination with one or more of the other methods described herein.

The volume of set material will have experienced similar flow and setting conditions to the settable material in the annulus. Thus, testing of the volume of set material will provide an indication of the features and qualities of the settable material in the annulus. Conventionally, small volumes of settable material are collected at surface and allowed to set at surface ambient conditions. These samples are then subject to testing. However, given the very different conditions experienced by the settable material in the annulus, the surface samples will be unlikely to provide an accurate representation of the features and qualities of the material that has set in the annulus.

The volume of settable material may be allowed to set in the well bore. The volume of settable material may be allowed to set while other operations are carried out, for example flushing residual settable material from the inner tubing string above the volume or circulating conditioning fluid through the well bore to control or modify the setting of the material in the annulus. The volume of settable material may be allowed to set before the inner tubing string is disconnected from the bore-lining tubing string. In other examples the volume of settable material may be allowed to set as the inner tubing string is retrieved from the well bore, or once the inner tubing string has been retrieved to surface.

The degree of setting of the settable material may be selected depending on the nature of tests to be conducted on the sample. In one example the setting time for a volume of cement slurry may be calculated as the time sufficient for the static gel strength (SGS) of the cement to reach or exceed 500 lbf/100 sq. ft (240 Pa).

The method may comprise providing a flow barrier in a lower end of the inner tubing string, whereby the settable material in the inner tubing string above the barrier is retained in the inner tubing string when the inner tubing string is disconnected from the bore-lining tubing string. The flow barrier may be a dart or a ball or may be a valve member. The flow barrier may be pumped or dropped into place.

The method may comprise at least one of pumping displacement fluid, flushing fluid or conditioning fluid behind the settable material, and a barrier such as a wiper dart may be provided between the settable fluid and the following fluid. Such a barrier may minimise contamination of the settable material by the following fluid.

The inner tubing string may be adapted to facilitate removal of the volume of settable material. For example, the inner tubing string may include a portion formed of separable parts or may include a portion including a polished or low friction surface or sleeve, to facilitate removing a core of set material from the tubing string.

An aspect of the disclosure also relates to settable material sampling apparatus comprising a hollow body for mounting between an inner tubing string and a bore-lining tubing string, and a flow barrier adapted to land in a lower portion of the hollow body to retain a volume of settable material in the hollow body when the hollow body is disconnected from the bore-lining tubing string.

The apparatus may be provided in combination with the other apparatus described herein.

Another aspect of the disclosure relates to a method for locating a bore-lining tubing string in a bore hole, the method comprising:

a) engaging a lower end of an inner tubing string with a lower end of a bore-lining tubing string;

b) pumping settable material down through the inner tubing string and a first flow port at a lower end of the bore-lining tubing string such that the settable material flows into a first annulus between the bore-lining tubing string and a surrounding bore wall;

c) closing the first flow port;

d) opening a second flow port in the inner tubing string above the lower end of the bore-lining tubing string;

e) pumping fluid down through the inner tubing string, out of the second flow port and into a volume between the inner tubing string and the bore-lining tubing string, the fluid then flowing into the volume between the inner tubing string and the bore-lining tubing string; and f) disengaging the lower end of the inner tubing string from the lower end of the bore-lining tubing and retrieving the inner tubing string from the bore hole.

The fluid may flow upwards through the volume between the inner tubing string and the bore-lining tubing.

The disclosure also relates to an associated apparatus. In one example, the apparatus comprises a tubular body for mounting on an inner tubing string, a first flow port, a second flow port, and a connector associated with the tubular body and operable to at least one of engage with and disengage from a lower end of a bore-lining tubing string, the apparatus having a first configuration in which the first flow port is open and the second flow port is closed, whereby a settable material may be pumped in a first direction downwards through the tubular body, through the connector, and through the first flow port, and a second configuration in which the first flow port is closed and the second flow port is open, whereby a fluid may be pumped in the first direction downwards through the tubular body, exit the tubular body through the second flow port, and then flow in a second direction upwards and externally of the tubular body.

According to a further aspect, the disclosure provides a work string for use in a bore hole, the work string comprising: a conduit connectable between a lower portion of a casing or liner in the bore hole and a top portion of the casing or liner; the conduit for providing a first flow path from the top portion to an outer side of the casing via the lower portion; and a valve in an outer wall of the conduit for selectively providing a second flow path between the conduit and an inner side of the casing or liner.

The valve in the conduit allows fluid to be pumped into an annulus defined between an outside of the work string and an inner side of the casing. The work string is typically used to pump a hardening fluid, such as cement, into an annulus defined between an outside of the casing and the walls of the borehole, so as to form hard walls (structural support) for the borehole.

Having the valve allows a fluid to be pumped through the work string to flush out residual hardening fluid remaining in the work string. This mixture of fluid and hardening fluid may then be flushed out from the inner side of the casing without disrupting the hardening fluid on the outside of the casing.

The valve also allows for pressure testing of the casing (e.g. by pumping a fluid into the inner side of the casing) while the hardening fluid is still in a flowable state.

This is advantageous because the pressure testing can cause the casing to expand outwards (to "balloon") during the test and relax back after the test. If the hardening fluid is still in a liquid state, it will flow back around the casing after the pressure test, forming a good connection between borehole and casing. By contrast, if the hardening fluid has already hardened, the pressure testing can cause cavities (weak points) when the casing relaxes back after testing.

The existence of the valve may also eliminate the need for an operator or robot (e.g. ROV) at the wellhead. This can both save costs and eliminate a point of failure, e.g. robot malfunction, from the process of forming the well in the borehole.

The valve may comprise a shear disc having a predetermined rupture pressure. Alternatively, or additionally, the valve may comprise a sliding valve having a sliding portion that selectively covers and uncovers a hole in the conduit. Multiple valves may be provided in the work string, as desired.

A shear disc covers an aperture in the work string that forms a purposely designed weak spot with a predetermined rupture pressure. Thus, the user can pump the hardening fluid at a pressure below that required to rupture the shear disc or (pop it out from its housing) and then can use a second fluid at a higher pressure to rupture the shear disc and thus open the valve. This is a simple arrangement that does not require any solid connection (e.g. levers) between the valve and the operator (which may be several hundred meters apart) and can be simply controlled by the pressure applied to the second fluid.

The sliding sleeve avoids introducing any debris into the fluid when opening (e.g. a popped shear disc).

In some embodiments, one end of the conduit comprises an adapter for connecting to the lower portion; and the valve may be formed in the adapter.

This allows the valve to be added to existing work strings whilst only requiring modification of the adapter end and not to the rest of the work string.

The present disclosure may also provide a system for cementing a borehole, the system comprising: a casing extendable within the bore hole, the casing defining an internal space and having an outer surface; and the work string as described above extending within the internal space and connected to a lower portion of the casing and to a top portion of the casing.

According to a second aspect, the present invention provides a method of using a work string in a casing, the method comprising: connecting the work string to a lower portion of the casing via an adapter to allow fluid flow through the work string into the lower portion; pumping a first fluid through the work string and through the lower portion to an outside of the casing; closing an aperture in the lower portion; opening a valve in the work string to allow fluid flow into an annulus defined by the work string and an inside of the casing; and pumping a second fluid through the work string and into the annulus.

Closing the aperture in the base portion allows the work string to be removed before the hardening fluid cures.

In some known designs, the work string does not connect to a lower portion of the casing at all but instead hangs above the lower portion. The hardening fluid is then pumped into the space inside the casing and then is forced down through a one-way check-valve in the base of the casing and into the annulus defined by the casing and borehole by pumping a second fluid into the space inside the casing (e.g. water). The one-way check-valve can leak if there is excessive pumping across the valve. According to the present disclosure, a wiper dart can be delivered via the work string to plug an aperture in the casing. This may eliminate the aforesaid failures of the check-valve. Further, the wiper dart can seal the flow path into the annulus and enable pressure to be built up within the work string in order to activate the valve.

The first fluid may be a fluid that hardens by curing. Preferably, the first fluid is cement.

In the method, the step of pumping the second fluid through the work string may be begun before the first fluid hardens.

The work string may be removed before the hardening fluid has hardened, which can reduce WOC time ("Wait-on-cement" time).

The step of pumping may be for performing a step of pressure-testing the casing before the first fluid hardens.

This allows for pressure testing that does not adversely affect the strength of the wall formed in the borehole by the casing and hardened fluid. Indeed, pressure testing while the hardening fluid is not yet hardened may improve the interfacial adhesion between hardening fluid and casing, resulting in an improved wall of the borehole when the hardening fluid has hardened.

The step of pumping the second fluid may be to wash residual first fluid out the work string and into the annulus before the first fluid hardens. Optionally, this may include washing the residual first fluid out of the casing via a top valve at an upper end of the casing (e.g. a valve in the running tool, such as a ball-valve).

This prevents any hardening fluid from undesirably hardening within the work string which can damage the work string or make it non-reusable. A work string is typically made from a number of component parts connected together sequentially and it is generally undesirable to permanently attach two adjacent component parts with the hardening fluid.

The top valve is preferably formed in a wellhead to which the casing is connected.

The pressure testing may comprise: pumping the second fluid into the annulus via the work string wherein the second fluid is water; and determining if a detected pressure-gradient is consistent with a sufficiently sealed annulus. If the casing fails the pressure test at the first step, the method may further comprise a step of: pumping drilling mud into the annulus via the work string; and determining if a detected pressure-gradient is consistent with a sufficiently sealed annulus.

The drilling mud is an engineering composition that has a fluid (e.g. water) and particulate matter suspended therein. The particulate matter can plug small holes or cracks in the casing so as to repair said hole or crack. Thus, the present method allows both testing and repair of the casing wall before the hardening fluid has hardened.

The various features described above may have utility when provided individually or in combination with other features described herein, including the features as listed in the attached claims.

BRIEF DESCRIPTION OF THE DRAWINGS

Certain features of the present disclosure will now be described in greater detail by way of example only and with reference to the accompanying drawings in which.

DETAILED DESCRIPTION

Figure 1:
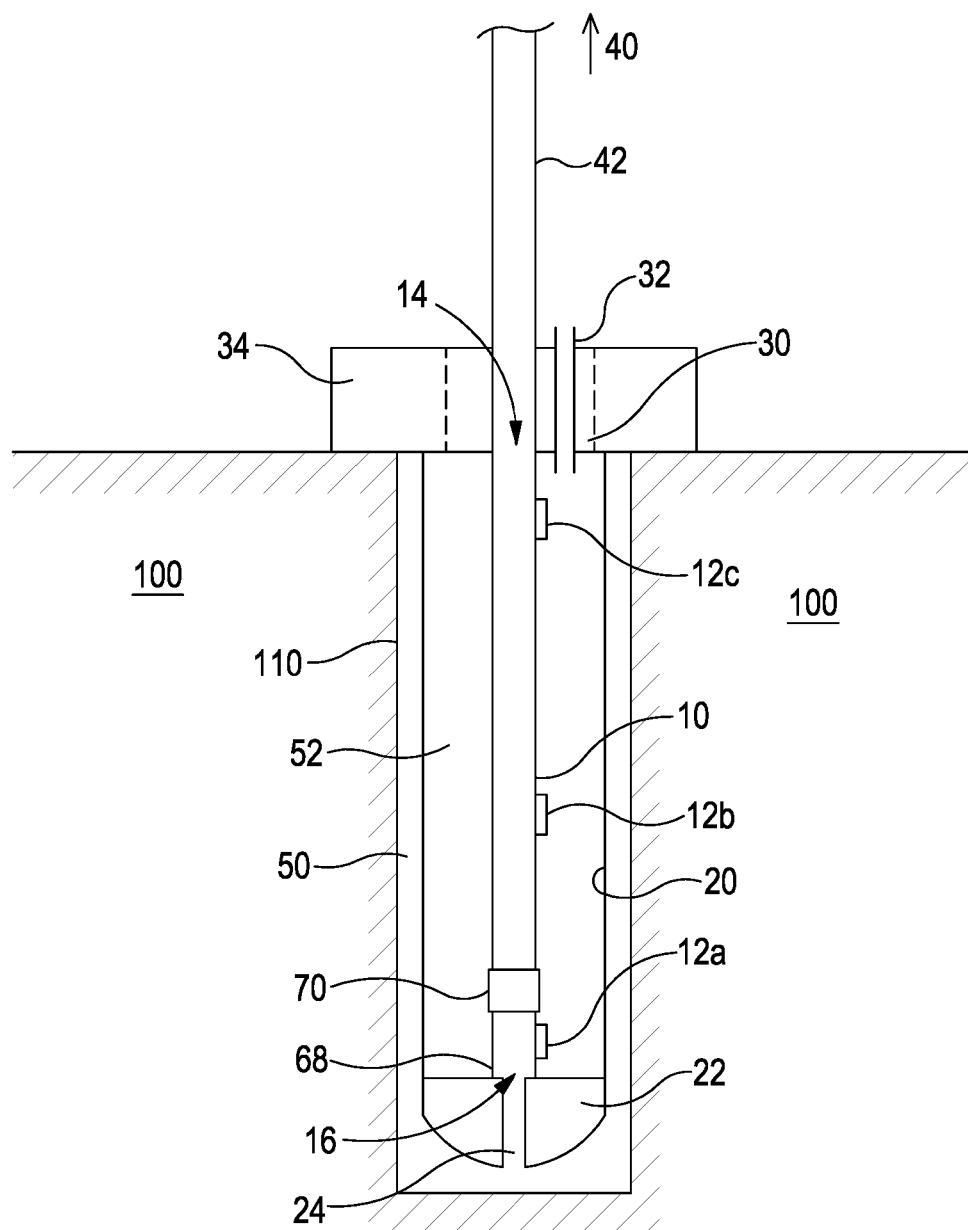
FIG. 1 shows a cross-sectional view of a work string extending within a casing that extends within a bore hole.

FIG. 1 shows a well bore or bore hole 110 that has been bored into the ground 100. A bore-lining tubing in the form of a casing 20 extends from a wellhead 34 into the bore hole 110 and defines an annulus 50 between the outside of the casing 20 and the earthen walls of the bore hole 110. As described later, this annulus 50 will be filled, either partially or in full, with a settable material 54 (shown in FIG. 2), such as a cement slurry, which will set in due course to form solid walls of the bore hole 110 to, for example, prevent the bore hole 110 from collapsing, protect and support the casing 20, and prevent fluid from within permeable formations 66 (FIG. 4) flowing up within the annulus 50.

A casing and liner are structurally very similar and may be made using identical piping. In the oil and gas exploration and extraction industry, a casing 20 refers to bore-lining tubing that extends from the wellhead 34 towards the base of the bore hole 110. A liner may extend only part of the way through the bore hole 110. Thus, a liner may be suspended from, for example, a casing section or another liner, rather than being connected to the wellhead 34. The term casing will be used predominantly herein but it should be understood that the below description is also applicable to a liner.

The drawings show only a single casing string 20, and this first casing is often referred to a "conductor". A conductor will typically have a relatively large outer diameter, for example 30 to 36 inches (76.2 to 91.4 cm), and an inner diameter of 28 to 33 inches (71.1 to 83.8 cm). As discussed herein, the disclosure is equally applicable to smaller subsequent casings which will locate with the conductor, and to liners.

An inner tubing in the form of a work string 10 extends down the inside of the casing 20. The work string 10 connects at a first or upper end 14 to a running tool 30 that is removably installed in the wellhead 34 that is located on the surface of the ground, or seabed, into which the bore hole 110 is drilled. The running tool 30 may engage with a casing hanger provided at the upper end of the casing. Alternatively, the running tool 30 and work string 10 may extend within a liner hanging from a liner hanger provided, for example, within the casing 20. A suitable running tool is available from OneSubsea, part number 2143701-48.

The second or lower end of the work string 10 includes a latching or stab-in connector 68 that is adapted to connect to a work or float shoe 22 that forms or connects to the base portion of the casing 20. A suitable shoe 22 is supplied by Forum Energy Technologies (Double valve latch-in float shoe with latch-down receptacle for latch-down plug, Type 500DVLLP-PVTS), and a suitable connector 68 is the Latch-in Adapter, Type B—133, 3", also supplied by Forum Energy Technologies, but modified by provision of three DOT Rupture ports to provide the valve 12a as described below.

In another example, rather than connecting to the shoe 22, the second end 16 of the work string 10 may connect to another piece near the base of the casing 20, for example a coupling provided in the casing 20 above the float shoe 22.

In general, the work string 10 may extend from the running tool 30 to a lower portion of the casing 20.

The work string 10 may be generally in the form of a pipe or a conduit that is able to convey fluid pumped from surface through the running tool 30 to the work shoe 22, and in this example a major portion of the string 10 is formed of drill pipe. Other tubular body portions including valves, seats, special couplings and the like may be provided within the work string 10. The drill pipe will typically have an outer diameter of 5½ inches (14 cm) and the sections of tubing incorporating valves, couplings and the like may have an outer diameter of 6 inches (15.2 cm). The work string 10 is coaxial with the casing 20 and thus the outer surface of the work string 10 and inner wall of the casing 20 define an inner or second annulus 52.

The work string 10 also comprises flow ports provided with respective valves 12a, 12b and 12c that selectively allow fluid communication between the inside of the work string 10 and the outside, for example such that fluid may flow from the interior of the work string 10 and into the second annulus 52. As described in more detail later, the valves 12a, 12b, 12c are initially closed while the settable material 54 is being pumped into the first annulus 50.

The work shoe 22 has a flow port or aperture 24 through which the settable material 54, conveyed from surface and down through the work string 10, may travel to the annulus 50 outside the casing 20. The flow port 24 may also include two float valves, one-way valves which prevent reverse flow of cement slurry back into the work string 10. After the desired volume of settable material 54 has been pumped into the annulus 50, the aperture 24 may be plugged and sealed, for example with a ball or dart 44 (see FIG. 3) to prevent further flow of fluid from the work string 10 into the annulus 50. The sealing dart 44 may be delivered from the surface, down a running or landing string 42, down the work string 10, and into the aperture 24, moving, for example, under cement displacement fluid pressure from surface pumps.

At or above the wellhead 34, the running tool 30 may connect to a running or landing string 42 that supports the casing 20 and work string 10 and extends to a source 40 of the settable material 54. The running tool 30 provides fluid communication from the landing string 42 to the work string 10 and seals the upper end of the casing 20, closing the upper end of the inner annulus. The source 40 may be, for example, a rig or ship on the sea surface in the case of an undersea bore hole 110, and in this example will include cement mixing and pumping facilities, and facilities for heating and pumping a second fluid such as water. Alternatively, the source 40 may be a drilling installation on the ground, in the case of a surface bore hole 110.

The casing 20 may be made up on the rig and may be run partially into the bore hole 110. With the upper end of the casing 20 supported at the deck of the rig, the work string 10 is then made up and run into the casing 20. The lower end of the work string 10 is provided with a latching or stab-in connector 68 and a telescopic coupling 70 which allows selective transfer of torque between upper and lower parts of the string 10. When axially extended the coupling 70 allows transfer of torque through the coupling 70 via an internal spline arrangement. When retracted by compression the spline arrangement is disengaged and the coupling 70 does not transfer torque and the upper part of the string 10 may rotate relative to the lower part of the string 10.

The running tool 30 is coupled to the upper end of the work string 10 and the running string 42 is coupled to the running tool 30. With the telescopic coupling 70 fully extended, the running tool 30 is positioned a short distance above the upper end of the casing 20 and the lower end of the work string 10 is positioned a short distance above the casing shoe 22. The running string 42 is then lowered to stab the work string connector 68 into the casing shoe 22. Lifting the running string 42 will confirm if the work string 10 is properly engaged with the shoe 22. After the second annulus 52 has been top-filled with fluid the running string 42 is then lowered further to engage the running tool 30 with the upper end of the casing 20. By rotation of the running string 42, a male left-handed thread on the running tool 30 engages a corresponding female thread on the casing 20, providing a secure and fluid-tight connection between the running tool 30 and the casing 20. The compression of the telescopic coupling 70 achieved by lowering of the running string 42 ensures that the rotation of the running string 42 and the running tool 30 does not result in corresponding rotation of the lower end of the work string 10. The assembly is then lowered from the rig, supported by the running string 42, to the position as illustrated in FIG. 1.

Figure 2:
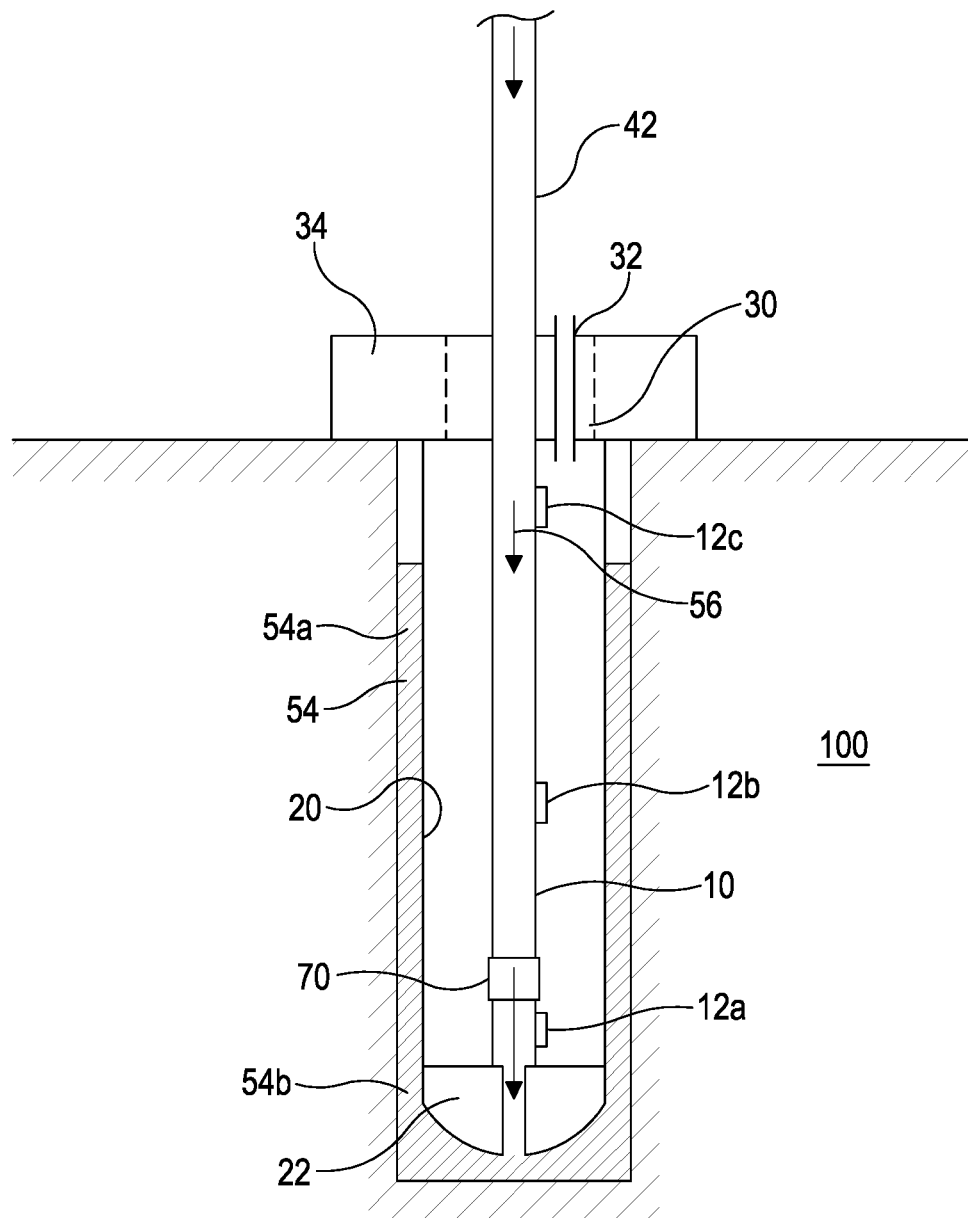
FIG. 2 shows the bore hole being filled with a settable material via the work string.

In operation, as shown in FIG. 2, the source 40 pumps the settable material 54 through the landing string 42 and into the work string 10 (in the direction of arrows 56). The settable material 54 flows from the first end 14 to the second end 16 of the work string 10 and into the aperture or first flow port 24 in the work shoe 22. The flow ports in the work string 10 provided with the valves 12a, 12b, 12c are closed at this point. The settable material 54 flows through the open aperture 24 into the first annulus 50 and fills the annulus 50. The settable material may be of a consistent composition or may comprise parts of different compositions and properties. For example, the lead slurry 54a may have a different composition from the tail slurry 54b.

Figure 3:
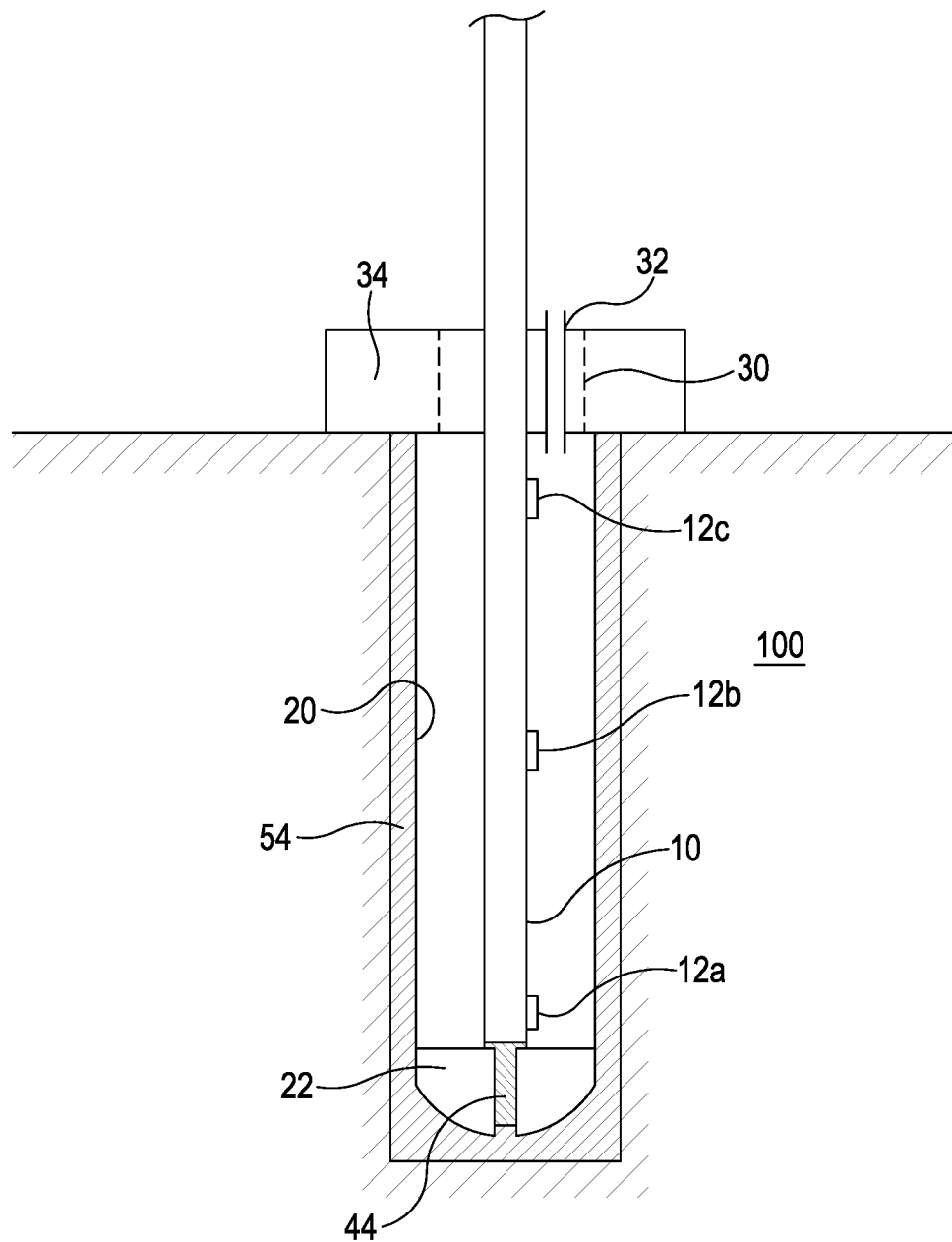
FIG. 3 shows a lower portion of the casing being plugged after the bore hole has been filled with settable material.

Once the annulus 50 is filled with the settable material 54, the sealing dart 44 for landing in the aperture 24 is placed in the landing string 42 and, following an additional volume of settable material, a wiper dart is placed in the string 42. The settable material flowing into the string 42 is then stopped and replaced by a flow of a second fluid, typically water. The dart 44 and the wiper dart travel down through the landing string 42 and the work string 10. On reaching the lower end of the work string 10 the dart 44 lands in and closes the aperture 24, as shown in FIG. 3.

Figure 4:
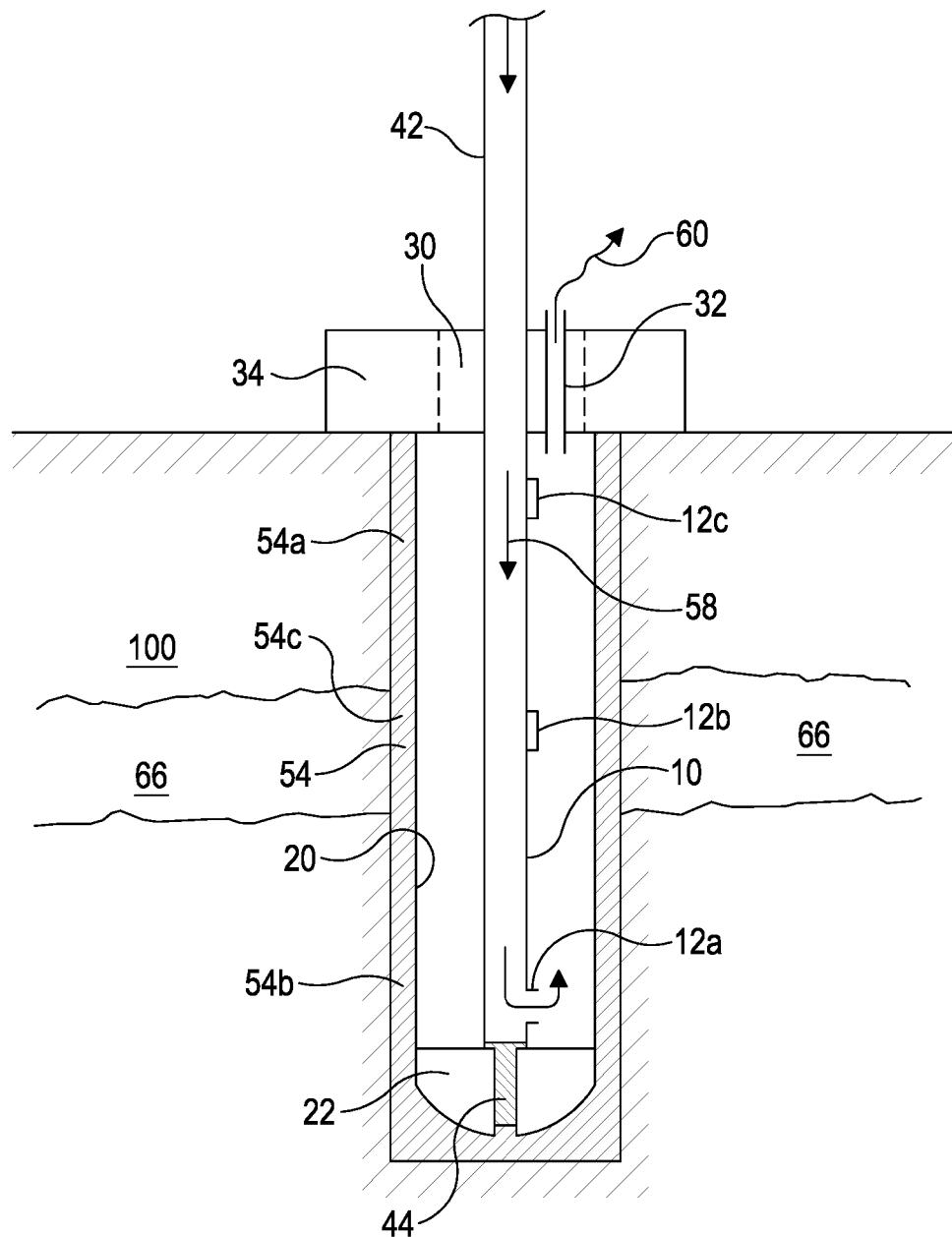
FIG. 4 shows a second fluid being pumped into the inside of the casing via a valve in the work string.

As shown in FIG. 4, the valve 12a in the work string 10 may be opened at this stage and the water being pumped from the source 40 through the landing string 42 and into the work string 10 (in the direction of arrows 58) will flush out any residual settable material 54 from the strings 42, 10 into the second annulus 52. This flushing may be continued for an extended period through a valve 32 on the running tool 30 that may allow fluid (for example a mixture of the second fluid and the residual settable material 54) to exit the second annulus 52 via the valve 32 (in the direction of arrow 60). In one example, the valve 32 is a ball-valve that is selectively and temporarily opened or closed by adjusting the rate of fluid flow or applying a greater fluid pressure by the source 40, down the work string 10, and into the second annulus 52. Alternatively, the valve 32 is selectively and temporarily opened or closed by simple intervention by a human or a robot, such as an ROV.

After or instead of the flushing process, the valve 32 allows for pressure testing of the new borehole walls formed by the casing 20 and the settable material 54. In this pressure testing process, the valve 32 in the running tool 30 is kept closed and a second fluid such as water is pumped from the source 40 into the second annulus 52 inside the casing 20. This increases the pressure on the inner wall of the casing 20. The observed increase in pressure and/or rate of increase in pressure (which may be monitored at or near the source 40) may be compared to an expected increase in pressure (or rate of increase in pressure, as appropriate).

Pressure testing may be performed while the settable material 54 is still unhardened or "green" (e.g. still liquid). During pressure testing, the casing 20 will generally expand outwards ("balloon") under the pressure from the second fluid. When the pressure is relieved, the casing 20 may then relax back to its original shape. In the case where the settable material 54 has not yet hardened, the settable material 54 will first be moved by the ballooning outward of the casing 20 and will then flow back when the casing 20 returns to its original shape. This flow may reduce the formation of weak-points which would occur if the fluid had already hardened and is then pushed away (or crushed) by the ballooning casing 20 and does not return after the ballooning subsides, creating a micro-annulus and compromising the hydraulic sealing capabilities of the setting material.

Further, the pressure testing, and the accompanying relative movement between the outer surface of the casing and the settable material 54, may improve adhesion between the casing 20 and the settable material 54.

During the pressure testing, if the observed increase in pressure is not as expected, this may indicate a leak in the casing 20. In this case, the valve 32 in the running tool 30 may be temporarily opened and a third fluid may be pumped into the second annulus 52 to displace the second fluid. The third fluid may be a drilling fluid or "mud", which is an engineering composition formed from of a fluid (e.g. water or oil) with particulate matter suspended therein. During pressure testing with the third fluid, the particulate matter from the drilling mud may fill small cracks in the casing 20 or gaps at connections between casing sections, to adequately repair the casing 20 and demonstrate the casing 20 has pressure-retaining integrity.

The fluid pumped into the second annulus 52 following the settable material 54 may be at a temperature selected to modify the hardening or curing of the settable material 54. For the bulk of cement slurries employed in the oil and gas exploration and extraction industry, typically comprising Portland cements, an increase in temperature will result in accelerated hardening, while a decrease in temperature will retard hardening.

In many cementing operations the most important portion of cement is that surrounding the lower end of the casing, as created by the tail slurry 54b. During a subsequent drilling operation, the casing shoe 22 and any cement in the bore 110 beyond the shoe 22 will be removed by drilling, and during this operation the casing 20, and the surrounding cement 54b, will experience shocks and vibration from the rotating drill bit. In many instances it is therefore the condition of this volume of cement 54b that is critical before further drilling may take place.

In most bore drilling operations, the temperature of the surrounding earth formations will increase with increasing depth. Accordingly, the cement slurry 54b towards the lower end of the bore 110 will likely experience higher temperatures than the cement slurry 54a towards the upper end of the bore 110. However, the earth formations may have been previously cooled by the circulation of flushing or cleaning fluid through the annulus 50 in preparation for cementing, and the cement slurry 54 may itself have been cooled as it is pumped from surface through the running string 42 and work string 10. In offshore operations, this may involve passage of the cement slurry through thousands of meters of cold sea water.

In accordance with an example of the present disclosure the second or conditioning fluid may be heated at surface before being pumped into the bore 110, such that the fluid is relatively hot when it flows out of the open valve 12a and into the second annulus 52 between the work string 10 and the casing 20. The heated fluid will warm the casing 20 which will in turn warm the surrounding cement slurry 54, thus accelerating hardening of the cement.

By supplying the heated fluid into the second annulus 52 via the lowermost valve 12a, the maximum heating effect will be achieved at the lower end of the bore 110, but the heated fluid will continue to circulate up through the second annulus 52 and will heat the intermediate and upper portions of the casing 20, and the surrounding cement slurry 54. Thus, the cement 54 in the first annulus 50 will harden more quickly than if no fluid, or unheated fluid had been pumped into the second annulus 52. The operator may supply a volume of heated fluid sufficient only to heat a lower portion of the bore, or may supply a larger volume of fluid, perhaps pumped at a higher rate, sufficient to heat the entire casing 20.

By way of example, in an offshore location such as the North Sea with a sea depth of 500 metres or greater, the temperature on surface may be 10.degree. C., and the temperature at the sea bed may be 5.degree. C. The settable material 54 prepared at surface will have an initial temperature of around 10.degree. C. but will be cooled as the material 54 is pumped from the rig, through the cold sea water. The settable material will then be warmed as it passes down through the well bore and into the first annulus 50, where the material will likely be at a temperature of around 15.degree. C. At this temperature, the time taken for the static gel strength (SGS) of cement to reach or exceed 500 lbf/100 sq. ft (240 Pa) is 10 to 12 hours. However if, in accordance with an example of the present disclosure, conditioning water is heated on the rig to 85.degree. C. and pumped into the well bore, and circulated through the second annulus 52 at a flow rate of 20 bbls/min (53 litres/second), the temperature within the well bore may be raised to 40.degree. C., at which temperature the time taken for the static gel strength (SGS) of cement to reach or exceed 500 lbf/100 sq. ft (240 Pa) is 1 to 2 hours. Accordingly, by providing a flow of heated conditioning fluid the setting time of the cement is very significantly reduced, allowing operations to continue much sooner than would have been the case if no heated fluid was provided. In addition, the elevated temperatures in the well bore result in set cement with much higher compressive strength.

In shallower water it is not necessary to heat the conditioning fluid to such a high temperature. For example, in similar conditions to those described above, but where the water depth is less than 100 metres, achieving a target temperature of 40.degree. C. at cement placement depth may be achieved by heating the conditioning fluid to a temperature of 50.degree. C. Conversely, in very deep or very cold water it may be difficult to achieve a temperature of 40.degree. C. at cement placement depth, however any increase in temperature in the well bore will accelerate cement setting and improve cement quality. For any given situation the operator may balance the costs of heating conditioning fluid to a higher temperature and pumping the heated fluid into the bore hole with the corresponding reduction in cement setting time, and the better quality of the set cement. However, with even a relatively small increase in temperature (c5.degree. C.) capable of providing a 20 to 40% reduction in setting time, pumping heated conditioning fluid into the bore hole will provide a significant advantage in many circumstances.

In other situations, it may be considered desirable to accelerate hardening of the settable material 54 only at a selected location in the bore 110, for example where the bore intersects a permeable formation 66, which may be a high-pressure fluid-producing formation or a low pressure formation. For some cement slurries, the slurry may become resistant to passage of fluid through the cement when the gel strength reaches a particular level. Accordingly, it may be desirable for the cement slurry 54c adjacent the formation 66 to reach this gel strength relatively quickly, which may be achieved by increasing the temperature of the slurry 54c. However, until the gel strength reaches this level it may be desirable that the gel strength of the slurry 54a above the formation 66 remains at a lower level, such that the slurry 54a continues to provide a hydrostatic head that retains the fluid in the formation 66 while the slurry 54c in contact with the formation hardens.

With the present apparatus, the selected location in the bore 110 may be targeted by opening the valve 12b in the inner string 10 adjacent the fluid-producing formation 66, such that the heated fluid enters the second annulus 52 adjacent the formation 66 which the operator would prefer to harden relatively quickly. Alternatively, or in addition, the operator may select to retard the setting of the cement slurry 54a above the formation 66, in which case cooled or cooler fluid may be directed into the second annulus 52 via an upper valve 12c.

Similarly, an operator may select to protect a low-pressure formation by accelerating hardening of cement slurry adjacent the formation.

Alternatively, the operator may pump heated fluid through the lowermost valve 12a at a very particular engineered flow rate, slow enough to allow the fluid to dissipate its heat as the fluid rises up through the second annulus 52 and create a large temperature gradient and control the rate at which the setting material goes through the transition zone (100-500 lbs/100 ft.sup.2 of static gel strength) at different locations in the bore. In effect, the operator may control the volume and location of settable material going through the transition zone at any point in time.

In another situation the operator may wish the slurry 54a at the upper end of the bore 110 to harden relatively quickly, for example to allow mounting of heavy subsea apparatus, such as a blow-out preventer (BOP), on the upper end of the casing 20. In this situation the operator may direct heated fluid through an upper valve 12c, to accelerate setting of the slurry 54a in the upper end of the annulus 50.

There may also be situations in which the operator wishes to restrict or avoid rises in temperature at selected locations. For example, in deep sea operations the sea bed may contain hydrates, molecules of natural gas bonded to frozen water molecules. If the temperature of the earth rises the gas molecules may be liberated, potentially leading to collapse of the heated area and uncontrolled release of large volumes of flammable gas. Setting cements may generate heat during hydration, and if left unchecked the resulting temperature rise in the surrounding earth may result in the release of gas. Accordingly, an operator may utilize the apparatus described above to direct fluid through the upper valve 12c into the upper portion of the second annulus 52, which fluid may cool the casing 20 and the adjacent cement slurry 54a, and thus avoid or reduce heating of the surrounding earth.

The valves 12a, 12b, 12c may be opened and closed in any desired sequence, and thus heated or cooled fluid may be supplied to selected bore locations to influence or control the setting of the material 54 in the annulus 50. In some examples it may not be necessary to heat or cool the fluid, as ambient temperature fluid may provide the desired conditioning.

Control of the valves 12a, 12b, 12c may be achieved by any appropriate mechanism, for example by pumping RFID tags into the inner string, which tags activate a selected valve to open or close. Alternatively, an operator may open and close the valves using darts or balls pumped into the inner string 10.

In some examples the operator may pump conditioning fluid into the well bore 110 to control or manage the thermal expansion or contraction of the bore-lining tubing 20. This may be to limit differential thermal expansion and contraction between the tubing 20 and the settable material, for example as induced by the heat of hydration of a setting cement. In another example the operator may maintain the temperature of the bore-lining tubing 20 below the ambient temperature of the well bore 110 until the settable material 54 has hardened. Once the material 54 has hardened, the temperature of the tubing 20 may be allowed to rise to the ambient well bore temperature, accompanied by thermal expansion of the tubing 20, which urges the outer surface of the tubing 20 into tighter contact with the inner surface of the set material 54. This "pre-loads" the set material 54, eliminating potential micro-annuli.

Conditioning fluid may be circulated into the annulus 50 before the settable material 54 is delivered into the well bore 110, to cool the walls of the well bore 110 and cool the bore-lining tubing 20. Conditioning fluid may be delivered to the annulus 50 via the work string 20 and through a first flow port, such as the aperture 24. Following the filling of the annulus 50 with settable material 54, conditioning fluid may be circulated through the second annulus 52 and a second flow port, such as the first valve 12a. Depending on the well bore conditions, the operator may choose to cool the conditioning fluid before delivering the fluid downhole, or it may be sufficient to circulate conditioning fluid that is at surface ambient temperature. As noted in the examples above, if conditioning fluid is delivered from a rig or ship through deep water the conditioning fluid will be cooled as it travels between the sea surface and the sea bed, and the fluid will still be relatively cool when it reaches the portion of the well bore containing the bore-lining tubing. A varying degree of cooling may be achieved by varying the flow rate of the conditioning fluid.

The conditioning fluid may be selected to have a relatively low density, such that the hydrostatic fluid pressure created by the column of fluid within the bore-lining tubing 20 remains relatively low and does not tend to balloon the bore-lining tubing outwards, or otherwise distort the casing 20, as the gel strength of the settable material 54 increases and the hydrostatic fluid pressure in the outer annulus 50 decreases. This facilitates the creation of a secure bond between the outer surface of the casing and the inner surface of the set material 54.

Figure 5:
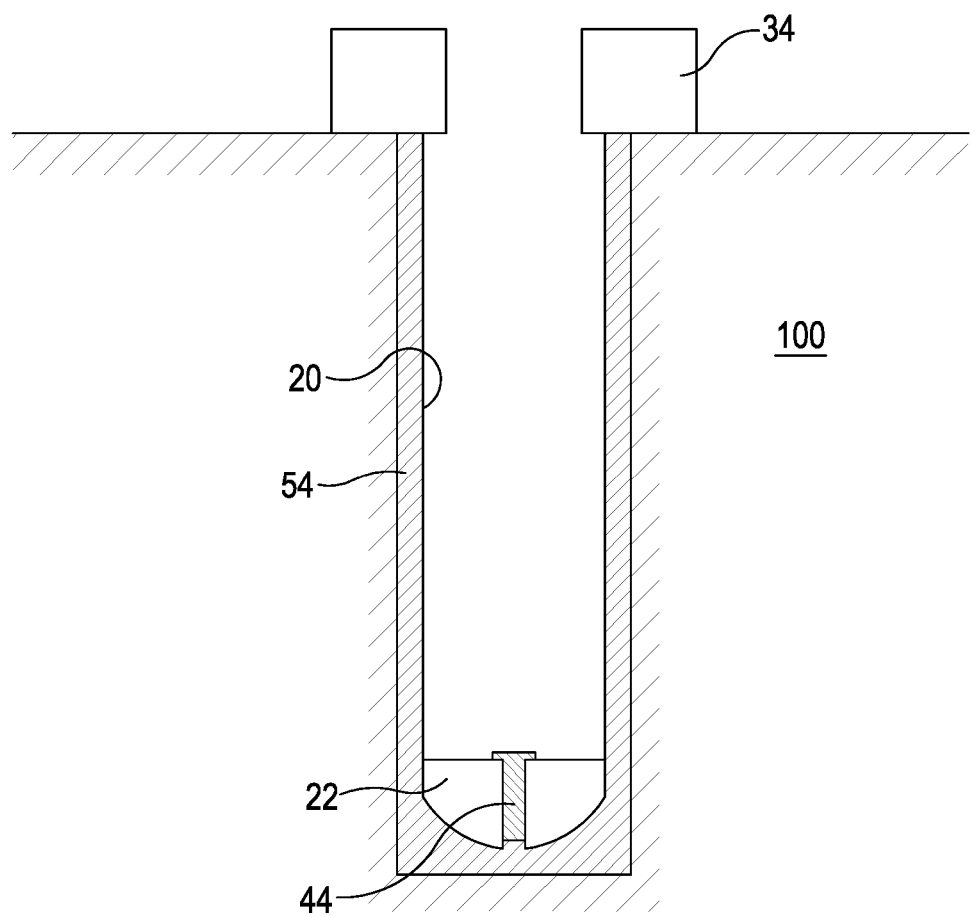
FIG. 5 shows the bore hole after the work string and running tool have been removed.

After any pressure testing, flushing, or cement conditioning, the work string 10 may be removed from the casing 20, as shown in FIG. 5. This is achieved by rotating the running string 42 to disengage the running tool 30 from the upper end of the casing 20. This may also cause activation of external seals provided on a casing hanger at the upper end of the casing 20. The running string 42 and running tool 30 are then raised to place the work string 10 in tension and extend the coupling 70. Rotation of the running string 42 may then be transferred to the lower end of the work string 10, permitting the connector 68 at the lower end of the string 10 to be unscrewed from the shoe 22. If the operator is unable to unscrew the work string 10 from the shoe 22, an overpull may be applied to shear out the string 10 from the casing 20.

The casing 20 and hardened fluid 54 remain in the borehole 110 to provide solid walls for the borehole 110 to prevent collapse and to provide a fluid-tight seal from the wellhead 34 to the work shoe 22. Thereafter, the bore 110 may be drilled further (which will involve drilling out the shoe 22 and any set cement below the end of the casing 20), to allow location of a further casing or liner, or an alternative apparatus may use the borehole 110, such as a pipe for conveying oil or natural gas from beneath the borehole 110 to a rig (not shown) at or above the wellhead 34.

In one example, at least one of the valves 12a, 12b, 12c is a shear disc that is designed to shear at a designated pressure difference between the fluid inside of the work string 10 and the fluid outside the work string 10. In this case, the settable material 54 is pumped at a pressure such that the shear disc does not shear during cement placement. After the settable material 54 has been displaced to fill the first annulus 50 and the aperture 24 in the work shoe 22 has been closed, the second fluid may be pumped into the work string 10 at a pressure above the pressure required to shear the shear disc. This opens the valve 12 and allows the second fluid (and any residual first fluid) to be flushed through the work string 10 and into the second annulus 52 and, optionally, out through the valve 32 in the running tool 30.

The lower valve 12a may be provided with a shear disc that fails at a first pressure, such that the second fluid is initially flowed through the valve 12a. If the operator wishes to direct fluid to another portion of the bore a valve-closing sleeve may be pumped into the work string 10 to close the valve 12a and then the pressure in the string is increased to burst a disc in another of the valves 12b, 12c.

Alternatively, only a single valve location may be provided on the work string 10. If desired the operator may direct conditioning fluid into a selected location in the annulus 52 by disengaging the work string 10 from the shoe 22 and raising the open valve to the desired location in the bore 110.

Figure 6:
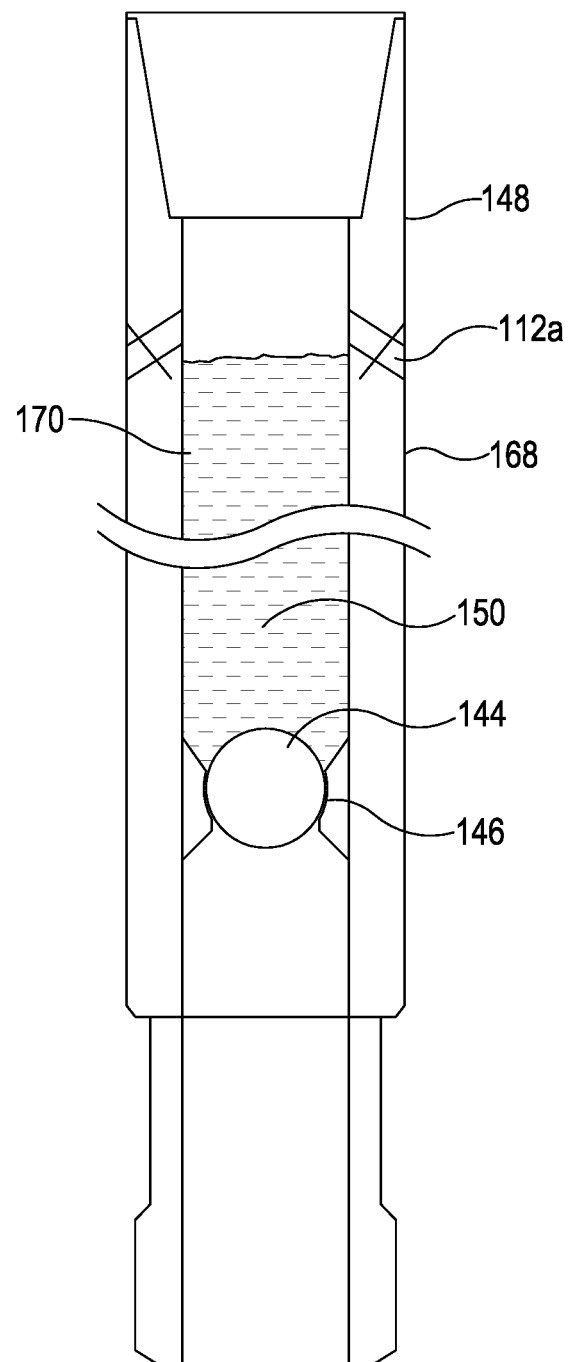
FIG. 6 shows a cement sampling feature.

Reference is now also made to FIG. 6 of the drawings, which illustrates a cement sampling feature in accordance with a further example of the present disclosure. In the example described above, once the annulus 50 is sufficiently filled with the settable material 54, the aperture 24 in the work shoe 22 is closed with a dart 44, as shown in FIG. 3. Thus, when the connector 68 is disengaged from the casing shoe 22 the lower end of the work string 10 is open. However, in the example of FIG. 6, rather than a dart 44 landing in the shoe 22, the flow passage between the lower end of the work string and the first annulus is closed by landing a ball 144 in a ball seat 146 provided in the connector 168. In both examples the lowermost inner string valve 12a, 112a is provided in the connector body 148, however in the example of FIG. 6 the connector body 148 is extended to provide a generally cylindrical sample volume 150 between the ball 144 and the valve 112a.

The ball 144 may be dropped into the work string after a desired volume of cement slurry 170 has been pumped into the first annulus. An operator will always prepare and pump an excess volume of cement slurry such that a column of cement slurry will remain in the lower end of the work string. The ball 144 may thus move downwards through this column of slurry and land on the ball seat 146. If desired, a larger second ball may be dropped into the work string and land on another ball seat just below the valve 112a.

When the valve 112a is opened, for example by pressuring up the work string and bursting a shear disc in the valve 112a, the column of cement slurry in the work string above the valve 112a will be pushed through the valve 112a and into the second annulus, followed by a displacement or flushing fluid. As discussed above with reference to the previous example, the operator may also choose to pressure test the cemented casing and circulate heated or cooled conditioning fluid through the second annulus to control the setting of the cement.

During these operations the volume of cement slurry 170 above the ball 144 and below the valve 112a will remain in the connector 168 and will begin to harden in a similar manner to the cement in the first annulus 50. For example, if the operator is supplying heated conditioning fluid through the valve 112a the setting of the cement slurry sample will be accelerated.

When it is desired to retrieve the work string from the well bore, the string is placed in tension and rotated from surface to unscrew the connector 168 from the casing shoe. When the connector 168 and the shoe separate, and as the work string is tripped out to the surface, the cement sample 170 is retained in the connector 168 by the ball 144.

On reaching the surface, the set cement sample 170 may be removed from the connector 168. This operation may be facilitated by forming the connector 168 of separable parts, or by providing a low friction sleeve within the connector 168 for containing the sample 170 and which may be easily removed from the connector 168.

The cement forming the sample 170 will have experienced similar conditions to the cement in the first annulus and thus will provide a more accurate indication of the condition of the cement in the annulus than a sample of cement slurry taking at surface and allowed to set under ambient surface conditions.

Although the methods and apparatus have been described in terms of particular examples as set forth above, it should be understood that these examples are illustrative only and that the claims are not limited to those examples. For example, it will be apparent to the skilled person that the apparatus and methods may be utilized in bore holes created for other purposes, for example injection wells, wells for accessing aquifers, and geothermal wells. Those skilled in the art will be able to make modifications and alternatives in view of the disclosure which are contemplated as falling within the scope of the appended claims.

The invention claimed is:

1. An apparatus comprising:
a tubular body for mounting on an inner tubing string; a first flow port; a second flow port; a third flow port, the first flow port, second flow port and third flow port being provided at axially spaced locations; and a stabbing/latching connector operatively associated with the tubular body and operable to at least one of stab and latch into engagement with a lower end of a bore-lining tubing string and then subsequently disengage from the lower end of the bore-lining tubing by at least one of axial and rotational movement of the connector relative to the bore-lining tubing, the apparatus having a first, second and third configurations, in the first configuration the stabbing/latching connector is engaged with the lower end of the bore-lining tubing string, the first flow port is open and the second and third flow ports are closed, whereby a settable material may be pumped in a first direction downwards through the tubular body, the connector, and the first flow port, in the second configuration the first flow port is closed and at least one of the second and third flow ports is open, such that the apparatus is adapted to allow a conditioning fluid to be pumped in the first direction down through the tubular body, through the at least one of the second and third flow ports, and then flow in a second direction upwards and externally of the tubular body, and in the third configuration the first flow port is closed and the stabbing/latching connector is at least one of rotated and axially translated to disengage from the lower end of the bore-lining string, whereby the inner tubing string is removable from the bore-lining tubing.

2. The apparatus of claim 1, comprising a plug member for landing in and closing the first flow port.

3. The apparatus of claim 1, wherein in the first configuration at least one of the second and third flow ports is closed by a shear disc.

4. The apparatus of claim 1, comprising a coupling portion permitting selective transmission of torque between portions of the inner tubing string, to permit selective transfer of torque between an upper portion of the inner tubing string and the connector.

5. The apparatus of claim 1, comprising a flow barrier adapted to land in a lower portion of the tubular body to retain a volume of settable material in the body when the tubular body is disconnected from the bore-lining tubing string.

6. The apparatus of claim 1, wherein the connector is operable to both engage with and disengage from the lower end of the bore-lining tubing string.

7. The apparatus of claim 1, further comprising a telescopic coupling portion for coupling to the inner tubing string, the telescopic coupling portion having an extended configuration to facilitate engagement and disengagement of the stabbing/latching connector and the lower end of the bore-lining tubing and a contracted configuration to facilitate engagement and disengagement of an upper end of the inner tubing string with an upper end of the bore-lining tubing.

8. An apparatus comprising:
a tubular body for mounting on an inner tubing string;
a first flow port;
a second flow port;
a third flow port, the first flow port, second flow port and third flow port being provided at axially spaced locations;
a connector operatively associated with the tubular body and operable to at least one of engage with and disengage from a lower end of a bore-lining tubing string, the apparatus having a first configuration in which the first flow port is open and the second and third flow ports are closed, whereby a settable material may be pumped in a first direction downwards through the tubular body, the connector, and the first flow port, and a second configuration in which the first flow port is closed and at least one of the second and third flow ports is open, such that the apparatus is adapted to allow a conditioning fluid to be pumped in the first direction down through the tubular body, through the at least one of the second and third flow ports, and then flow in a second direction upwards and externally of the tubular body
further comprising a coupling portion permitting selective transmission of torque between portions of the inner tubing string, to permit selective transfer of torque between an upper portion of the inner tubing string and the connector, wherein the coupling portion is telescopic and in an extended configuration permits transmission of torque and in a contracted configuration prevent transmission of torque.

9. A method of conditioning a well bore comprising:
(a) running an assembly comprising a bore-lining tubing and an inner tubing located within the bore-lining tubing into a well bore whereby an outer annulus is defined between the bore-lining tubing and a surrounding bore wall and an inner annulus is defined between the bore-lining tubing and the inner tubing, then
(b) at least partially filling the outer annulus between the bore-lining tubing and the surrounding bore wall with settable material, and then
(c) pumping conditioning fluid through the inner tubing located within the bore-lining tubing and into the inner annulus defined between the bore-lining tubing and the inner tubing to affect a temperature of a portion of bore-lining tubing adjacent the inner annulus, whereby a temperature of the conditioning fluid is controlled so as to influence the setting rate of the settable material in at least a portion of the outer annulus adjacent the conditioning fluid;
(d) retaining a volume of the settable material in a lower end of the inner tubing;
(e) allowing the volume of settable material to set;
(f) retrieving the inner tubing from the well bore; and
(g) removing the volume of set material from the inner tubing.

10. A method of conditioning a well bore comprising:
(a) running an assembly comprising a bore-lining tubing and an inner tubing located within the bore-lining tubing into a well bore, whereby the bore-lining tubing and the inner tubing forming the assembly are run into the well bore simultaneously, and whereby an outer annulus is defined between the bore-lining tubing and a surrounding bore wall and an inner annulus is defined between the bore-lining tubing and the inner tubing, then
(b) at least partially filling the outer annulus between the bore-lining tubing and the surrounding bore wall with settable material, and then
(c) pumping conditioning fluid through the inner tubing located within the bore-lining tubing and into the inner annulus defined between the bore-lining tubing and the inner tubing to affect a temperature of a portion of bore-lining tubing adjacent the inner annulus, whereby a temperature of the conditioning fluid is controlled so as to influence a setting rate of the settable material in at least a portion of the outer annulus adjacent the conditioning fluid, and then
(d) disengaging a lower end of the inner tubing from a lower end of the bore-lining tubing and removing the inner tubing from the bore-lining tubing without disturbing the settable material.

11. The method of claim 10, wherein the conditioning fluid is cooled to below ambient temperature before being directed into the well bore.

12. The method of claim 10, wherein the conditioning fluid is heated to above ambient temperature before being directed into the well bore.

13. The method of claim 10, wherein the conditioning fluid flows from the inner tubing directly into at least one of: a volume at a lower portion of the inner annulus; a volume at an intermediate portion of the inner annulus; and a volume at an upper portion of the inner annulus.

14. The method of claim 10, comprising closing a first fluid port providing fluid communication between the inner tubing and the outer annulus between the bore-lining tubing and the bore wall, and opening a second fluid port providing fluid communication between the inner tubing and the inner annulus between the inner tubing and the bore-lining tubing.

15. The method of claim 10, wherein the temperature of the conditioning fluid is controlled to at least one of maintain and increase a temperature of the settable material to accelerate setting of the settable material.

16. The method of claim 10, wherein the temperature of the conditioning fluid is controlled to increase a temperature of at least a part of a portion of the well bore containing the bore lining tubing by at least one of 5° C. or more, 10° C. or more, 15° C. or more, 20° C. or more, 25° C. or more, 30° C. or more, 35° C. or more, or 40° C. or more.

17. The method of claim 10, comprising accelerating the setting rate of the settable material, using the conditioning fluid, in a portion of the outer annulus between a lower end of the bore-lining tubing and the surrounding bore wall.

18. The method of claim 10, comprising accelerating the setting rate of the settable material, using the conditioning fluid, in a portion of the outer annulus between an upper end of the bore-lining tubing and the surrounding bore wall.

19. The method of claim 10, wherein the temperature of the conditioning fluid is controlled to at least one of maintain and decrease a temperature of the settable material to at least one of stop, slow and extend the setting rate of the settable material.

20. The method of claim 10, wherein the conditioning fluid cools a selected location of the well bore.

21. The method of claim 10, wherein the conditioning fluid offsets a heating effect created by hardening of the settable material.

22. The method of claim 10, comprising varying a density of the conditioning fluid to vary a hydrostatic pressure created by the conditioning fluid.

23. The method of claim 10, wherein the conditioning fluid is heated and remains in liquid form.

24. The method of claim 23, wherein the conditioning fluid is heated to no more than 75° C. above ambient temperature at a surface of the well bore.

25. The method of claim 10, further comprising: coupling a telescopic coupling portion to the inner tubing string and, at step (d), extending the telescopic coupling portion when disengaging the lower end of the tubing section from the lower end of the bore-lining tubing.

* * * * *